United States Patent [19]
Baldwin

[11] Patent Number: 5,457,595
[45] Date of Patent: Oct. 10, 1995

[54] LOW-POWER RELAY OPERATING CIRCUIT

[75] Inventor: John R. Baldwin, Newtown, Conn.

[73] Assignee: Hubbell Incorporated, Orange, Conn.

[21] Appl. No.: 136,901

[22] Filed: Oct. 18, 1993

[51] Int. Cl.$^6$ ................................................. H01H 47/00
[52] U.S. Cl. ........................... 361/160; 361/173; 307/117
[58] Field of Search ........................... 361/139, 143, 361/152, 155, 156, 157, 160, 170, 173, 174, 175, 189, 190; 307/117

[56] References Cited

U.S. PATENT DOCUMENTS

| | | | |
|---|---|---|---|
| 3,629,649 | 12/1971 | Del Zotto | 315/159 |
| 3,636,357 | 1/1972 | Del Zotto | 361/175 |
| 4,340,826 | 7/1982 | Muchnick | 307/157 |
| 4,874,962 | 10/1989 | Hermans | 307/116 |
| 5,148,158 | 9/1992 | Shah | 315/86 |

*Primary Examiner*—Jeffrey A. Gaffin
*Attorney, Agent, or Firm*—Jerry M. Presson; Walter C. Farley

[57] ABSTRACT

A high-power relay with a low-power operating circuit is usable in combination with a low-current source of DC power. The source has a hot terminal and a common terminal and a bistable relay has an energizing relay winding with one terminal of the winding connected to the common terminal of the supply. First and second semiconductor switches are connected to a second terminal, the switches being alternately operable in response to control signals to respectively set and reset the relay. First and second capacitors are connected to the first and second semiconductor switches, respectively, and first and second charging circuits are connected to the low-current source and to the first and second capacitors, respectively, to charge the capacitors from the source. The switches are connected to selectively discharge the capacitors in opposite directions through the energizing relay winding thereby to SET and RESET the relay in response to control signals. A method of operating the circuit is also disclosed.

6 Claims, 3 Drawing Sheets

LOW-POWER RELAY OPERATING CIRCUIT

FIELD OF THE INVENTION

This invention relates to a low-power consumption circuit for operating a relay from a source of power which derives energy from trickle or leakage current between the hot conductor of a mains power source and ground.

BACKGROUND OF THE INVENTION

Although the present invention may have other applications, it will be described in the context of a system for operating lights in a desired space or area in response to movement of a human body in a monitored area in or near the space.

The desirability of actuating lights only when they are needed has been recognized for some time and several systems for performing this task have been developed. In general terms, such a system usually includes a sensor capable of detecting the presence of a person in a space, a relay for operating lights illuminating the space and a circuit for operating that relay when the sensor detects the person and for deenergizing the relay when no person is present, or after the last person leaves the space.

In many applications, it is desirable to be able to install a circuit for this purpose to operate an existing lighting system. The circuit itself can be installed in an existing switch box in place of the original switch. This raises the problem of a usable source of current when the switch box is not wired with a neutral wire. That problem can be solved using the leakage current technique disclosed in U.S. Pat. No. 4,340,826, Muchnick, but the available power is quite low. The result is that, while the circuit will operate, it requires relatively expensive components as well as careful selection and design to minimize the power requirements.

SUMMARY OF THE INVENTION

An object of the present invention is to provide an improved switching and relay operating circuit operable from a low-current source such as a leakage current supply.

A further object is to provide such a circuit which is inexpensive and operates with high reliability.

Briefly described, the invention includes a low-power relay operating circuit usable in combination with a low-current source of DC power having a hot terminal and a common terminal and employing a bistable relay having an energizing winding with first and second terminals, the first terminal of the winding being connected to the common terminal of the supply. First and second semiconductor switches are connected to the second terminal, the switches being alternately operable in response to control signals to respectively set and reset the relay. First and second capacitors are connected to the first and second semiconductor switches, respectively, and first and second charging circuits are connected to the low-current source and to the first and second capacitors, respectively, to charge the capacitors from the source. The switches are connected to selectively discharge the capacitors in opposite directions through the relay winding to thereby SET and RESET the relay in response to control signals.

BRIEF DESCRIPTION OF THE DRAWINGS

In order to impart full understanding of the manner in which these and other objects are attained in accordance with the invention, a particularly advantageous embodiment thereof will be described with reference to the accompanying drawings, which form a part of this disclosure, and wherein.

DESCRIPTION OF THE PREFERRED EMBODIMENT

Figure 1:
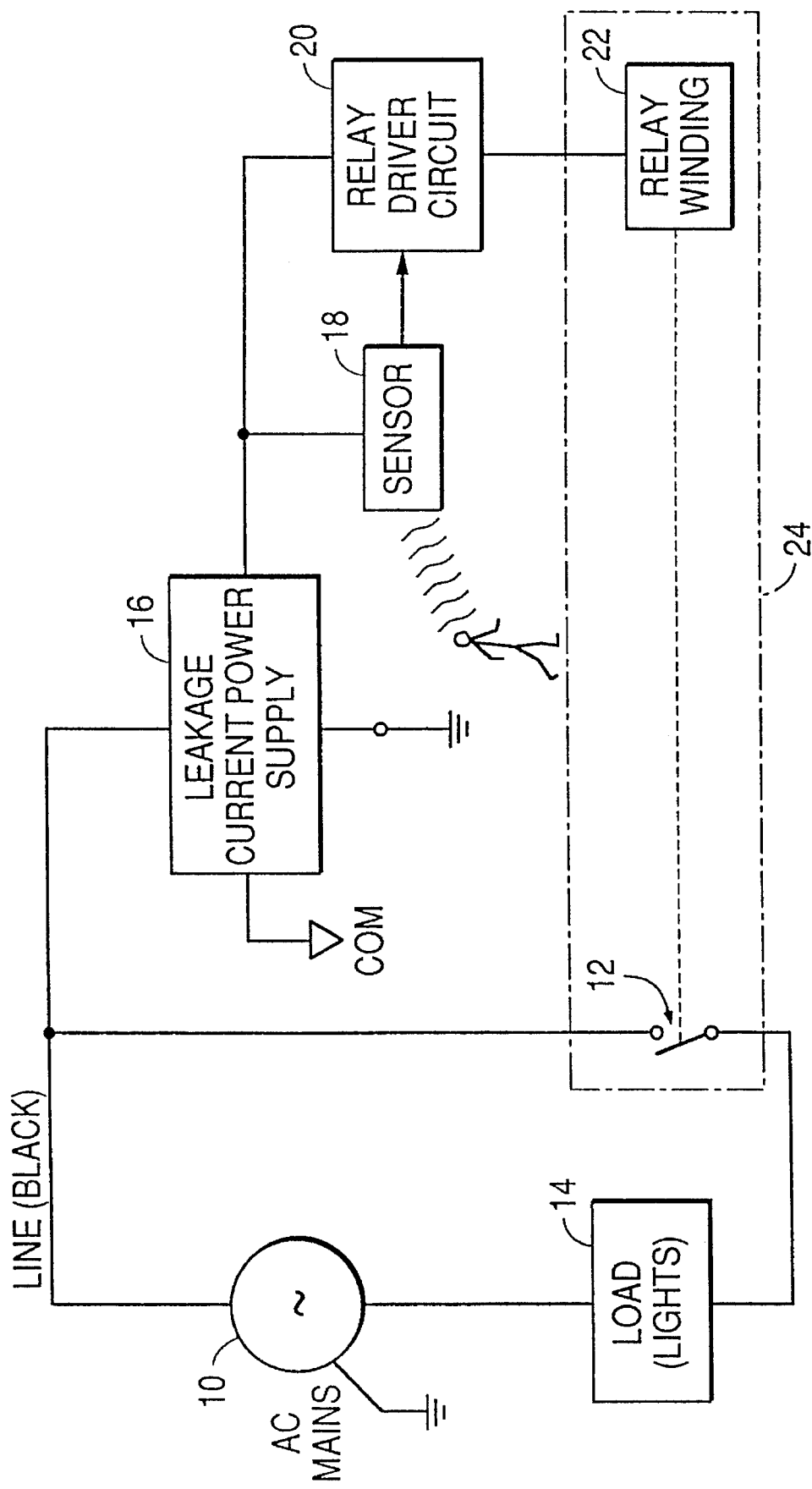
FIG. 1 is a schematic block diagram of a system for operating lights in response to the presence of a person and including a circuit in accordance with the present invention.

Referring first to FIG. 1, an AC supply 10 is connected in series by a black hot or line wire to a normally open contact set 12 and to a load 14 which, in this case, will be regarded as lights to illuminate a specific space or area which can be indoors or outdoors. The AC supply will be considered to be a 110 V. supply although it will be recognized that other standard levels of supply voltage can be used with the system upon suitable selection of component values. It is important to recognize that supply 10 is connected to the system by a hot wire which has black insulation, that the return current to load 14 is through a red-insulated wire, that the return from the load to the supply is a white neutral wire and that the AC system also has an earth ground which, if insulated, is green. At some location near the source of the supply system, the white neutral would be connected to earth ground.

A leakage current power supply 16 is connected between the black line wire and the green or earth ground wire. This is called a leakage current power supply because it depends upon current which is less than 500 microamperes (μa) for the power which is used in the sensor, relay driver and relay portions of the system. Although relay contact set 12 switches relatively high current to the load, typically 12.5 to 15 amperes, the relay winding itself is operated with very low current and the sensor and relay driver are also operated from the leakage supply.

In order to meet electrical codes in most locations and in order to comply with the standards set by Underwriters Laboratories (UL), an electrical system cannot be wired or constructed in such a way that it allows current to flow between a hot wire and ground, or between a neutral wire and ground, of more than 500 μa. So long as a circuit is arranged to pass no more than that amount of current, it is regarded as being safe and is acceptable by UL. Because 277 VAC RMS is commonly used for industrial and other lighting systems, the present system is designed to pass no more than 500 μa at 277 VAC. When the system is operated at 100 VAC, the leakage current is 180 μa. Thus, in order to operate the components of the system, all power must be derived from that 180 μa. From this, it will be apparent that all parts of the system which depend on that power supply must operate with extremely low power consumption.

A sensor 18 is supplied with power from supply 16 and is provided with a means for responding to the presence of a human to produce a control signal to a relay driver circuit 20. In the preferred embodiment of the invention, the sensor is an infra-red (IR) sensor which is passive and which responds to the rate of change of the temperature contrast between the background of the field of view and the object or person entering the field of view. While other known forms of sensors for detecting motion or for otherwise detecting human presence could be used, the passive IR type of sensor is regarded as being highly reliable and effective and uses the least energy.

Relay driver circuit 20 is also supplied with its operating power from supply 16 and includes means for supplying SET and RESET signals to the actuating winding 22 of a bistable relay 24 which includes contact set 12. Relay 24 is bistable in the sense that it requires no current at all in order to maintain it in either of two possible states. Thus, it is movable to a SET state in which contact set 12 is closed and to a RESET state in which the contact set is open. Current in one direction through the winding is necessary to move it from RESET to SET, and in the other direction from SET to RESET, but when current is totally removed, the relay will stay in its last state.

Preferably, a known type of bistable relay is used which is called a remenance relay. This type of relay has a single coil and uses a combination of spring pressure and remenance of a magnetic iron circuit, its residual magnetism, to maintain either relay contact state even when power is not present. It requires a larger signal to SET the relay than to RESET it. This type of relay is preferred over a two-coil bistable relay for reasons of cost and size.

As will be apparent from the above, in the simplified system shown in FIG. 1, the AC power is supplied to the high-current system including load 14 only when contact set 12 is closed and is continuously supplied to power supply 16. When a person is detected in the field of view of sensor 18, the sensor circuit produces a control signal which activates relay driver circuit 20, causing relay 24 to change to its SET state, closing contact set 12 and energizing the lights to illuminate the selected area. As will be seen from the following discussion, the sensor and relay driver circuits are preferably constructed with an automatic time-out feature so that, after a predetermined interval following the last motion detection, a signal is generated which causes the relay to return to its RESET state, opening the contact set and turning the lights off.

Turning now to the more detailed diagram of FIG. 2, it will be noted that the components and overall blocks which correspond to those discussed in connection with FIG. 1 have the same reference numerals. The high current load circuit is shown in a somewhat heavier line to clearly distinguish that circuit from the low power circuits. An additional component in the high current circuit is a manually operable, three-position switch indicated at 26. When switch 26 is in the "on" position shown, the lights are always on and the remaining circuits have no function. When switch 26 is in the "off" position, the lights are always off and the remaining circuitry also has no function. In the "auto" position, the system operates as described above.

Leakage current supply 16 will be seen to include a full-wave rectifier 30 which has AC connections to the hot wire of the AC supply through a current-limiting resistor 31 and to earth ground. Resistor 31 keeps the current to ground to a level less than the 500 µa at 277 V. discussed above. Rectifier 30 has DC connections to a common terminal which is a system ground and to an output terminal 34 which is connected to the +V terminals in circuit 20. Terminal 34 is thus the supply terminal for the sensor and relay. A Zener diode 36 and storage capacitor 37 control the level of the voltage provided by the leakage current, capacitor 37 acting to store the current so that it can reach a usable level. The output from capacitor 37 supplies a 5 V. regulator in the IR sensor circuit which supplies the components in that circuit.

Figure 3:
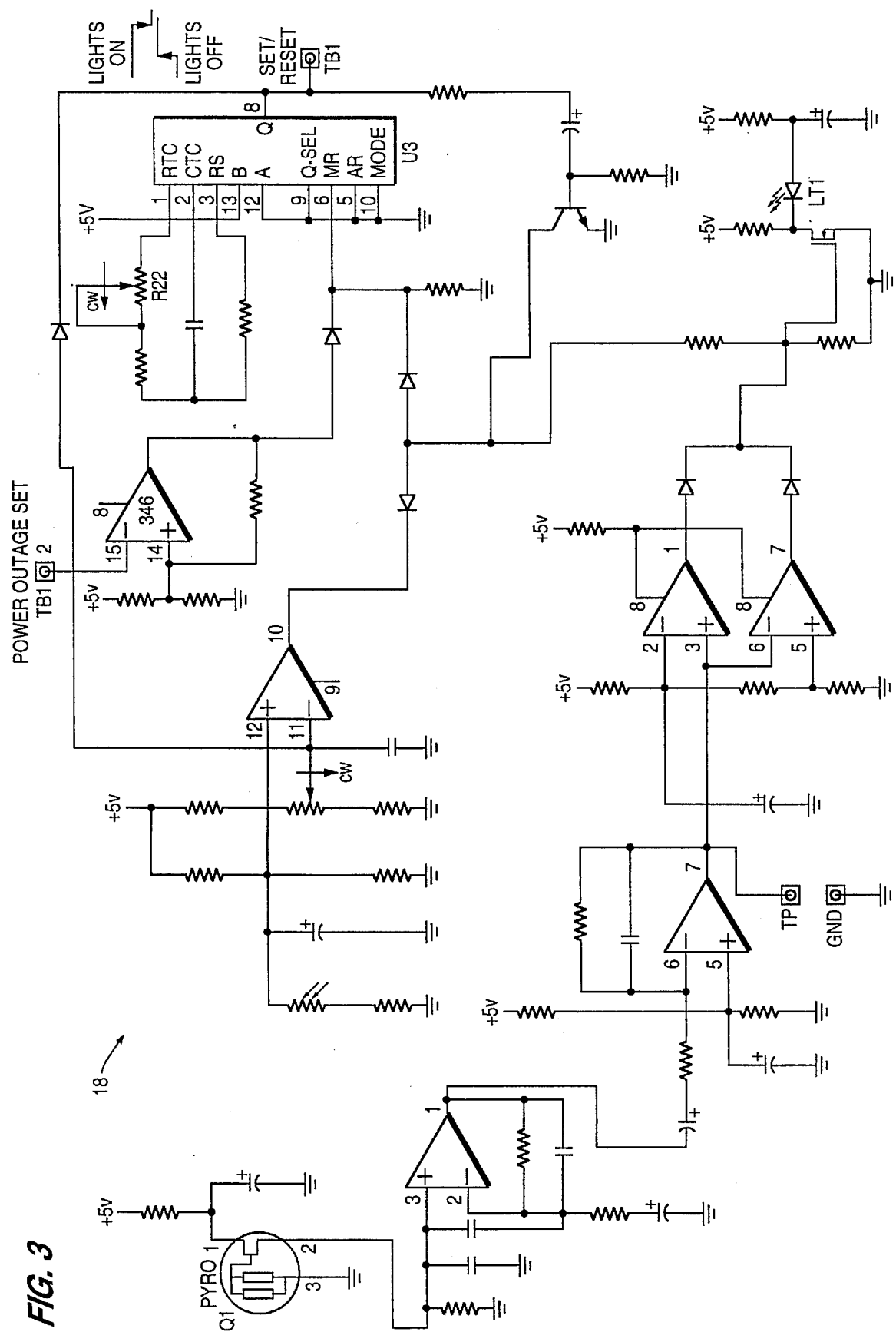
FIG. 3 is a schematic circuit diagram of an infrared sensor circuit usable in the system of FIG. 1.

The sensor circuit will be shown in greater detail in FIG. 3. For present purposes, it is sufficient to point out that when the sensor detects the presence of a person in the area being monitored, it produces a change in level at an output terminal 40. In the present embodiment, the level change goes from high to low when motion is sensed. This level change constitutes a control signal which is connected to the relay driver circuit through a resistor 42 to the base of a transistor Q1, causing Q1 to turn off (i.e., become non-conductive). When Q1 turns off, a current path is formed from +V through resistor 43, capacitor 44 and resistor 45. The signal which is produced across resistor 45 turns on a field effect transistor (FET) Q2 for a short interval during which the drain of Q2 goes to 0 volts, turning on a transistor Q4 through a resistor 46. Under stable conditions, a capacitor 47 connected to the collector of Q4 is charged from +V through a resistor 48. The emitter-collector circuit of transistor Q4 is in series with relay winding 22 so that when Q4 becomes conductive, the conductive emitter-collector circuit discharges capacitor 47 through energizing winding 22, which is connected between Q4 and the common circuit point indicated by a conventional ground symbol, causing the relay to change to its SET state and closing contact set 12.

Sensor circuit 18 includes a time delay which is re-started each time motion is sensed, keeping the control signal output at terminal 40 low. After the last motion sensed, the time delay circuit keeps the level at terminal 40 low for an adjustable interval of from 1 to 20 minutes. At the end of that interval, the control signal level at terminal 40 returns to its high level, returning transistor Q1 to its conductive state, but nothing else happens in the circuit including transistors Q1, Q2 and Q4.

Under quiescent conditions, a capacitor 52 charges from +V through resistors 53 and 54. The change of the control signal to high produces current flow through a capacitor 49 and a resistor 50 which produces a signal at the gate of an FET Q3 which is turned on. When Q3 turns on, its drain goes nearly to zero, providing a discharge path for capacitor 52 through relay winding 22 (which is a lower impedance path than resistor 54), a diode 56, a resistor 57 and the drain circuit of FET Q3. This current through winding 22 is in the opposite direction from that produced by the conductivity of transistor Q4 and therefore returns the relay to its RESET state.

It will be observed that there are several features in the operation of this circuit which operate to conserve energy and cost and which allow the circuit to operate from the relatively low-power leakage current supply. First, the current which operates the relay to change it between the SET and RESET states comes from capacitors which store energy obtained from the supply when the circuits are not operating and then "dump" that energy where and when it is needed, thereby reducing the energy demands on supply 16 itself. It will also be noted that capacitors 47 and 52 are provided with substantially independent charging and discharging paths which allows the capacitors to be operated independently in both directions. Resistor 54 is large enough so that any bleeding of charge from capacitor 47 is negligible.

Furthermore, using a remenance relay with one coil means that the energy required for RESET is smaller than the energy required for SET, allowing capacitor 52 to be considerably smaller than capacitor 47, again reducing cost. Despite the small energy required to switch the relay from one state to the other, contacts 12 are able to control substantial current to operate the lights.

Figure 2:
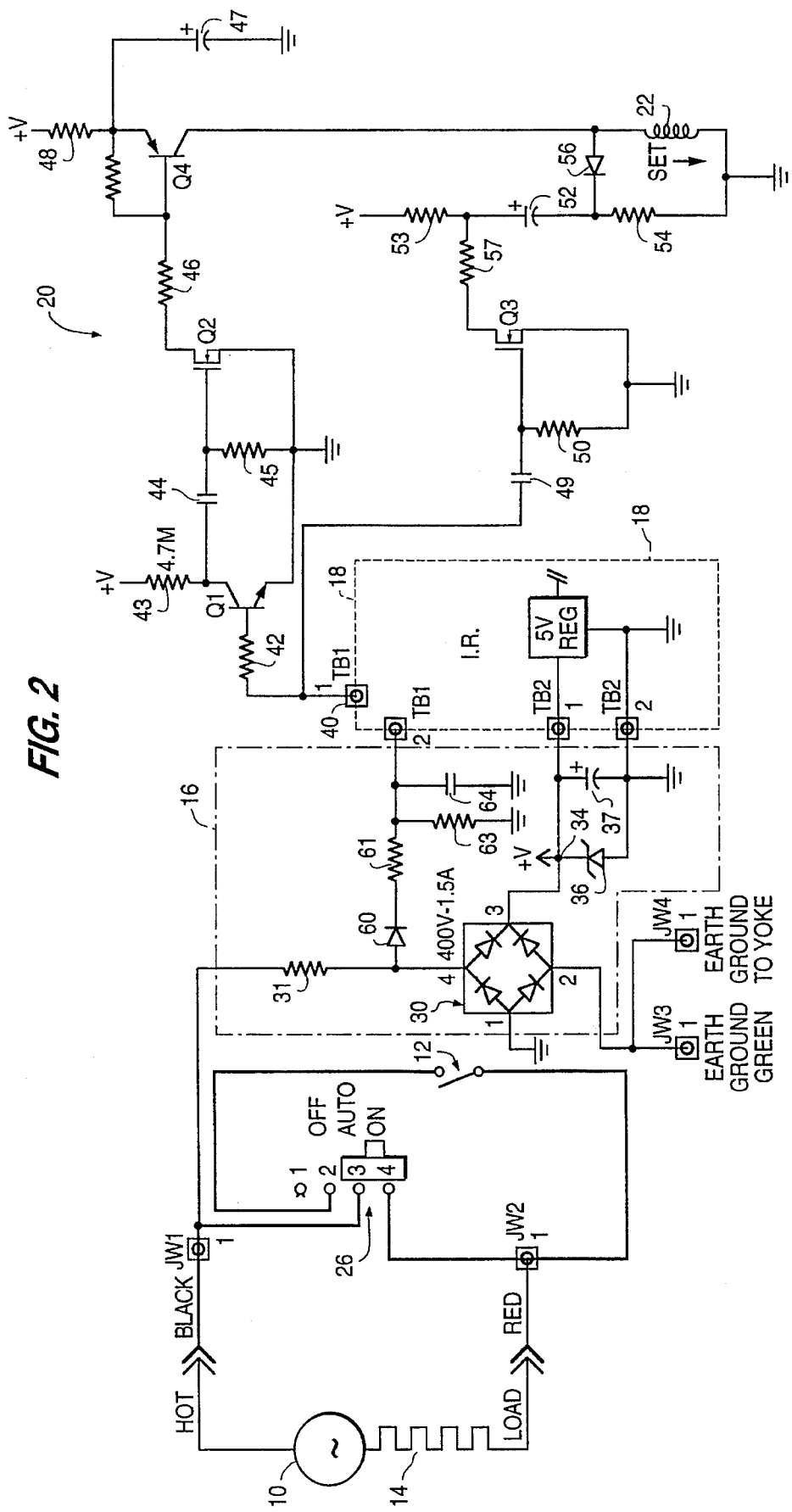
FIG. 2 is a schematic circuit diagram of a circuit in accordance with the invention usable in the system of FIG. 1.

It will be noticed that the circuit of FIG. 2 includes a diode 60 in series with a resistor 61 and the parallel combination of a resistor 63 and a capacitor 64. During normal operation of the system, these components play no part in its operation. However, in the event of a power failure, they deliver a "set" signal to the IR sensor circuit, causing relay 24 to be SET and contacts 12 to close so that, when the power is restored, the lights will be on.

FIG. 3 shows a schematic diagram of an IR sensor circuit usable in the system of FIG. 1. While other circuits are usable, the one illustrated is capable of operating on rather little energy and provides the changes in voltage levels and the timing functions discussed above. Since this part of the system is not part of the present invention, it will not be described in detail and is included only for completeness. It should be mentioned, however that the timing functions discussed above are performed by an integrated circuit U3 in conjunction with a resistive network having an adjustable resistor R22 which can be adjusted to choose the desired delay interval before shutoff of the lights. Also, the IR sensor itself is identified as Q1 PYRO and is a purchasable IR sensor. The power outage set signal discussed above is connected to terminal TB1 terminal 2 and the circuit output terminal 40 is from pin 8 of IC U3. The circuit also includes a light emitting diode (LED) LT1 which flashes when the sensor first detects motion in its field of view. The LED is positioned at the switch control location, near manual switch 26.

While one advantageous embodiment has been chosen to illustrate the invention, it will be understood by those skilled in the art that various changes and modifications can be made therein without departing from the scope of the invention as defined in the appended claims.

What is claimed is:

1. A low-power relay operating circuit comprising the combination of a low-current source of DC power having a hot terminal and a common terminal;

a bistable relay having an energizing winding with first and second terminals;

means connecting said first terminal of said winding to said common terminal of said source;

first and second semiconductor switches connected to said second terminal, said switches being alternately operable in response to control signals to respectively set and reset said relay; first and second capacitors connected to said first and second semiconductor switches, respectively;

first and second charging circuits connected to said low-current source and to said first and second capacitors, respectively, to charge said capacitors from said source, said switches being connected to selectively discharge said capacitors in opposite directions through said relay winding in response to said control signals.

2. A circuit according to claim 1 wherein said first semiconductor switch comprises a transistor having an emitter-collector circuit connected in series with said relay winding between said hot terminal of said source and said common, and said first capacitor is connected between said common and the emitter of said transistor.

3. A circuit according to claim 2 wherein said second semiconductor switch comprises a transistor having a switchable conductive path connected in series circuit relationship with said relay winding, said second capacitor and a diode poled to permit current flow in the reset direction of said relay winding.

4. A circuit according to claim 1 wherein said first semiconductor switch is connected between said first capacitor and said relay winding, and wherein said second capacitor is connected between said second semiconductor switch and said relay winding.

5. A circuit according to claim 1 wherein said first and second semiconductor switches are transistors.

6. A method of operating a single-coil, bistable relay from a low-power source of energy, the relay being movable between SET and RESET states, the method comprising:

connecting a first end of a switchable conductive path of a first semiconductor switch to a first capacitor and the second end of the path to the coil of the bistable relay, connecting a first end of a switchable conductive path of a second semiconductor switch to one side of a second capacitor and the other side of the second capacitor to the coil of the bistable relay, independently charging the capacitors from the source through separate resistors, selectively rendering the switchable paths of the transistors conductive so that one switch discharges its associated capacitor through the coil to SET the relay and the other switch discharges its associated capacitor to RESET the relay.

\* \* \* \* \*